(12) United States Patent
Tongue et al.

(10) Patent No.: US 12,368,347 B2
(45) Date of Patent: Jul. 22, 2025

(54) COOLING ELECTRONICS OF POWER TOOLS

(71) Applicant: Norbar Torque Tools Limited, Oxfordshire (GB)

(72) Inventors: Matthew Tongue, Oxfordshire (GB); Richard Radini, Oxfordshire (GB)

(73) Assignee: Norbar Torque Tools Limited, Oxfordshire (GB)

( * ) Notice: Subject to any disclaimer, the term of this patent is extended or adjusted under 35 U.S.C. 154(b) by 231 days.

(21) Appl. No.: 18/073,109

(22) Filed: Dec. 1, 2022

(65) Prior Publication Data

US 2024/0186865 A1    Jun. 6, 2024

(51) Int. Cl.
*H02K 9/06* (2006.01)
*H02K 5/20* (2006.01)
*H02K 7/14* (2006.01)

(52) U.S. Cl.
CPC .............. *H02K 9/06* (2013.01); *H02K 5/207* (2021.01); *H02K 7/145* (2013.01)

(58) Field of Classification Search
CPC ........... H02K 9/06; H02K 5/207; H02K 7/145
See application file for complete search history.

(56) References Cited

U.S. PATENT DOCUMENTS

| | | | |
|---|---|---|---|
| 7,786,627 B2 * | 8/2010 | Riedl | B25F 5/008 310/60 R |
| 8,627,900 B2 | 1/2014 | Oomori et al. | |
| 8,821,131 B2 * | 9/2014 | Yokota | F04B 39/066 417/415 |
| 9,450,471 B2 | 9/2016 | Mergener et al. | |
| 9,528,506 B2 * | 12/2016 | Yoshida | F04B 35/06 |
| 9,577,493 B2 | 2/2017 | Ekstrom et al. | |
| 9,590,475 B2 | 3/2017 | Oomori et al. | |
| 9,718,180 B2 | 8/2017 | Hester et al. | |
| 9,774,229 B1 | 9/2017 | Mergener et al. | |
| 9,954,417 B2 | 4/2018 | Mergener et al. | |
| 9,960,656 B2 | 5/2018 | Mergener et al. | |

(Continued)

FOREIGN PATENT DOCUMENTS

CN    103358266 A    10/2013
CN    111136608 A    5/2020

(Continued)

OTHER PUBLICATIONS

European Patent Office, Extended Search Report issued in corresponding Application No. 23213508.7, dated May 16, 2024, 7 pp.

(Continued)

*Primary Examiner* — Forrest M Phillips
(74) *Attorney, Agent, or Firm* — Taft Stettinius & Hollister LLP (57) ABSTRACT

A power tool with two cooling systems. A first cooling system for cooling a motor of the power tool, and a second cooling system for cooling electronic components of the power tool. The first cooling system includes a motor fan that draws cooling air into the power tool through one or more motor air inlet ports to cool the motor. The second cooling system includes another fan that may run continuously, or be turned on at a predetermined temperature, independent of the first fan, and cools the electronic components independently from the first cooling system.

21 Claims, 6 Drawing Sheets

(56) References Cited

U.S. PATENT DOCUMENTS

| | | |
|---|---|---|
| 10,155,292 B2 | 12/2018 | Weiss et al. |
| 10,530,220 B2 | 1/2020 | Mergener et al. |
| 10,710,172 B2 | 7/2020 | Carlson et al. |
| 10,828,705 B2 | 11/2020 | Carlson et al. |
| 10,926,393 B2 | 2/2021 | Zawisza et al. |
| 11,031,843 B2 | 6/2021 | Mergener et al. |
| 11,052,502 B2 | 7/2021 | Weiss et al. |
| 11,059,155 B2 | 7/2021 | Zawisza et al. |
| 11,141,850 B2 | 10/2021 | Van Hoorn |
| 11,185,932 B2 | 11/2021 | Carlson et al. |
| 11,203,105 B2 | 12/2021 | Van Hoorn |
| 11,691,262 B2 * | 7/2023 | Numata ............... B25F 5/026 173/217 |
| 2006/0255756 A1 | 11/2006 | Iwata et al. |
| 2011/0303718 A1 | 12/2011 | Spasov et al. |
| 2012/0302147 A1 | 11/2012 | Trautner et al. |
| 2013/0255981 A1 | 10/2013 | Noto et al. |
| 2017/0043457 A1 | 2/2017 | Tsuge |
| 2019/0296608 A1 | 9/2019 | Mergener et al. |
| 2020/0052559 A1 | 2/2020 | Matsushita et al. |
| 2021/0094155 A1 | 4/2021 | Banba et al. |
| 2021/0252617 A1 | 8/2021 | Obermann et al. |
| 2022/0193791 A1 | 6/2022 | Kamiya |
| 2022/0216799 A1 * | 7/2022 | Yoshinari ............ H02M 3/33546 |
| 2022/0286024 A1 | 9/2022 | Nakatsuka et al. |
| 2022/0314417 A1 | 10/2022 | Kamiya |
| 2023/0173650 A1 * | 6/2023 | Shinto ................. B25F 5/00 173/2 |

FOREIGN PATENT DOCUMENTS

| | | |
|---|---|---|
| CN | 113172572 A | 7/2021 |
| CN | 114423566 A | 4/2022 |
| CN | 114643551 A | 6/2022 |
| CN | 115194697 A | 10/2022 |
| EP | 1715565 A1 | 10/2006 |
| EP | 2404708 A2 | 1/2012 |
| EP | 2527099 B1 | 7/2014 |
| EP | 3603896 A1 | 2/2020 |
| TW | I338407 B | 3/2011 |
| TW | 201206650 A | 2/2012 |
| TW | I657899 B | 5/2019 |
| TW | I691387 B | 4/2020 |
| WO | 2021021534 | 2/2021 |

OTHER PUBLICATIONS

Taiwan Patent Office, Office Action issued in corresponding Application No. 112146662, dated Sep. 10, 2024, 16 pp.

* cited by examiner

COOLING ELECTRONICS OF POWER TOOLS

TECHNICAL FIELD OF THE INVENTION

The present invention relates generally to a cooling system for power tools, and more particularly a cooling system for switching electronics of a power tool.

BACKGROUND OF THE INVENTION

Power tools, such as drills and other torque application type tools, are commonly used to complete industrial or home improvement tasks. Many power tools are portable and electrically powered, such as with a battery, allowing a user to apply torque or force on a workpiece without exerting a substantial amount of energy. These types of power tools generally include a motor and electronic components for controlling the motor.

Many of these power tools generate heat from the motor and/or the electronic components. However, heat from electrical components must be minimized and/or controlled. Traditionally, a fan that is integral to the motor draws cooling air in through a rear of the tool housing, and through the motor to cool the motor. The cooling air, which passes though the motor to collect heat from the motor, then passes down through a handle grip portion of the power tool, where the electronic components are located, to cool the electronic components. The cooling air, which collected heat generated by the motor and the electronic components, is then exhausted out of the handle via vents positioned at a bottom of the handle.

However, in some cases, the motor and electronic components are not adequately cooled, and continuous use of the power tool causes the motor and/or electrical components to overheat, thus causing the power tool to shut off or cease operating to protect the motor and electronic components. Once shut off, the power tool cannot be used and must cool before continued use is possible.

SUMMARY OF THE INVENTION

The present invention relates broadly to a cooling system for cooling electrical components of a power tool that includes a motor, such as, for example, power switching electronics (PSE). The motor may be a brushless DC (BLDC) type motor. In an embodiment, the present invention includes two, separated cooling systems; a first or motor cooling system for cooling the motor of the power tool, and a separate, second or PSE cooling system for cooling the power switching electronics of the power tool. The first cooling system includes a motor fan that draws cooling air into the power tool through one or more motor air inlet ports, and around and/or through the motor to cool the motor. The second cooling system includes a separate fan that may run continuously or be turned on at a predetermined temperature to draw in cooling air that is separate from the motor cooling air, to cool the power switching electronics independently from the first cooling system. The second cooling system draws cooling air into the power tool through one or more PSE air inlet ports, and over and/or around the power switching electronics to cool the power switching electronics. Thus, by having separate cooling air systems for the motor and electrical components, the electrical components can be cooled with cooling air that has not first collected heat from the motor, thus resulting in cooling air that can better cool the electronic components. Thus, the present invention minimizes tool shut down due to overheating. Further, because the second cooling system for the electronic components is independent from the first cooling system, the second cooling system can be operated when the motor is not being operated, thereby minimizing heat buildup.

In an embodiment, the present invention relates broadly to a power tool including a cooling system for cooling electronic components, such as, for example, power switching electronics (PSE), internal to the power tool. The power tool includes a housing including a motor housing portion and electronic components housing portion. A motor having front and rear ends is disposed in the motor housing portion. The electronic components are disposed in the electronic components housing portion, wherein the electronic components includes a printed circuit board (PCB) and switching elements disposed on the PCB, the PCB is disposed proximal to the rear end of the motor and forms a barrier between the motor housing portion and the power switching electronics housing portion. A fan is disposed in the electronic components housing portion and is adapted to cause cooling air to flow into the electronic components housing portion to cool the electronic components.

In another embodiment, the present invention relates broadly to a power tool including a cooling system for cooling power switching electronics (PSE). The power tool includes a housing including a motor housing portion and a power switching electronics housing portion. A motor having front and rear ends is disposed in the motor housing portion. A first fan is coupled to the motor and is adapted to cause cooling air to flow into the motor housing portion to cool the motor. The PSE is disposed in the power switching electronics housing portion, wherein the PSE includes a printed circuit board (PCB) and switching elements disposed on the PCB, and the PCB is disposed proximal to the rear end of the motor and forms a barrier between the motor housing portion and the power switching electronics housing portion. A second fan is disposed in the power switching electronics housing portion, which can be operated independently of the first fan, and is adapted to cause cooling air to flow into the power switching electronics housing portion to cool the electronic components.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a cooling system for cooling electronic components, such as, for example, power switching elements, of an electrically powered power tool that includes a motor. The motor may be, for example, a brushless DC (BLDC) type motor. In an embodiment, the present invention includes two cooling systems; a first cooling system for cooling the motor of the power tool, and a second cooling system for cooling the electronic components of the power tool. The first cooling system includes a motor fan that draws cooling air into the power tool through one or more motor air inlet ports, and around and/or through the motor to collect heat from the motor, thus cooling the motor. The second cooling system includes another fan that may run continuously or be turned on at a predetermined temperature, and may be operated independently of the fan of the first cooling system, and cools the electronic components independently from the first cooling system. The second cooling system draws air into the power tool through one or more electronic components air inlet ports, and around and/or over the electronic components to cool the electronic components. The second cooling system minimizes tool shut down due to overheating. The second cooling system also allows the power tool to be run or operated continuously, without premature shut down due to overheating of the electronic components. Further, because the second cooling system is independent from the first cooling system, the second cooling system can be operated when the motor is not being operated, such as when the tool is in stand-by mode, thereby minimizing heat buildup.

Figure 1:
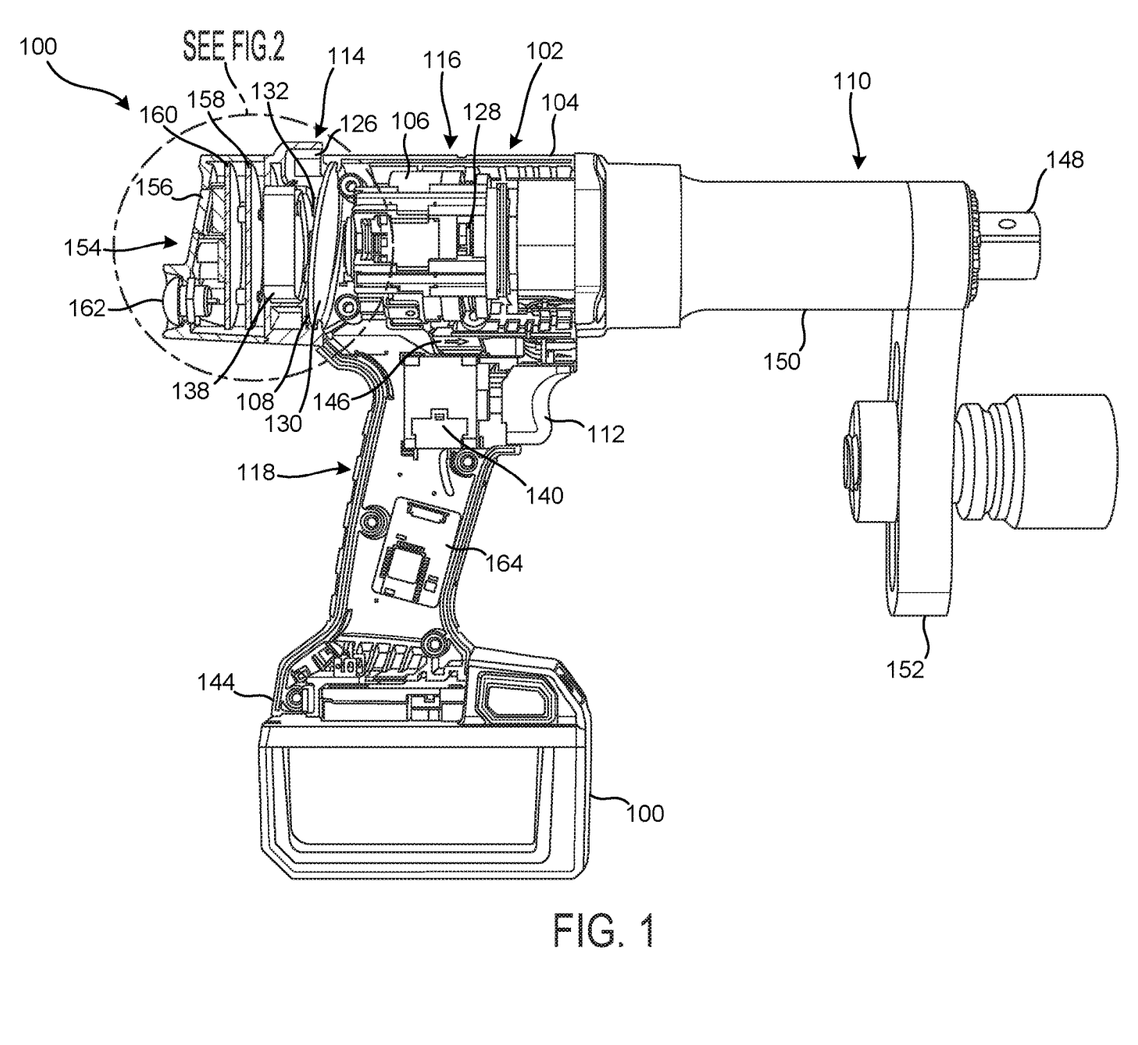
FIG. 1 is a side partial section view of an exemplar tool including motor and electronic components cooling systems, according to an embodiment of the present invention.

Referring to FIG. 1, a tool 100 (such as a power tool) is illustrated. The tool 100 includes a housing 102 (also referred to as a tool housing) having first and second housing portions 104 (respectively forming first and second sides of the housing 102), a motor 106 disposed in the housing 102, electronic components 108, such as, for example, power switching electronics (PSE), disposed in the housing 102, an output nose mechanism 110 coupled to the housing 102 at a front or working end of the tool 100 and operably coupled to the motor 106, and an actuatable trigger 112 adapted to operate the motor 106. In an embodiment, the PSE are operably coupled to and adapted to control the motor 106.

In an embodiment, the housing 102 is a clamshell-type housing having first and second housing portions 104 that are mirror images of each other and coupled together to cooperatively form the housing 102. In another embodiment, the housing 102 (including the first and second housing portions 104) may be a single integrated or monolithic piece. While only one housing portion 104 is illustrated, it will be appreciated that the other housing portion is substantially a mirror image of the illustrated housing portion 104.

The housing 102 includes an electronic components housing portion 114, a motor housing portion 116, and a handle housing portion 118 formed by the first and second housing portions 104. The electronic components housing portion 114 may be disposed proximal to a rear end of the tool housing 102 opposite the output nose mechanism 110 and behind the motor 106. The motor housing portion 116 may be disposed between the electronic components housing portion 114 and the output nose mechanism 110. The handle housing portion 118 may extend from the motor housing portion 116. In an embodiment, the motor housing portion 116 and handle housing portion 118 may be disposed at an angle relative to each other. For example, in an embodiment, a longitudinal axis of the motor housing portion 116 and a longitudinal axis of the handle housing portion 118 may be disposed at an angle of about 100 to about 120 degrees, and more particularly about 110 degrees relative to each other.

Figure 3:
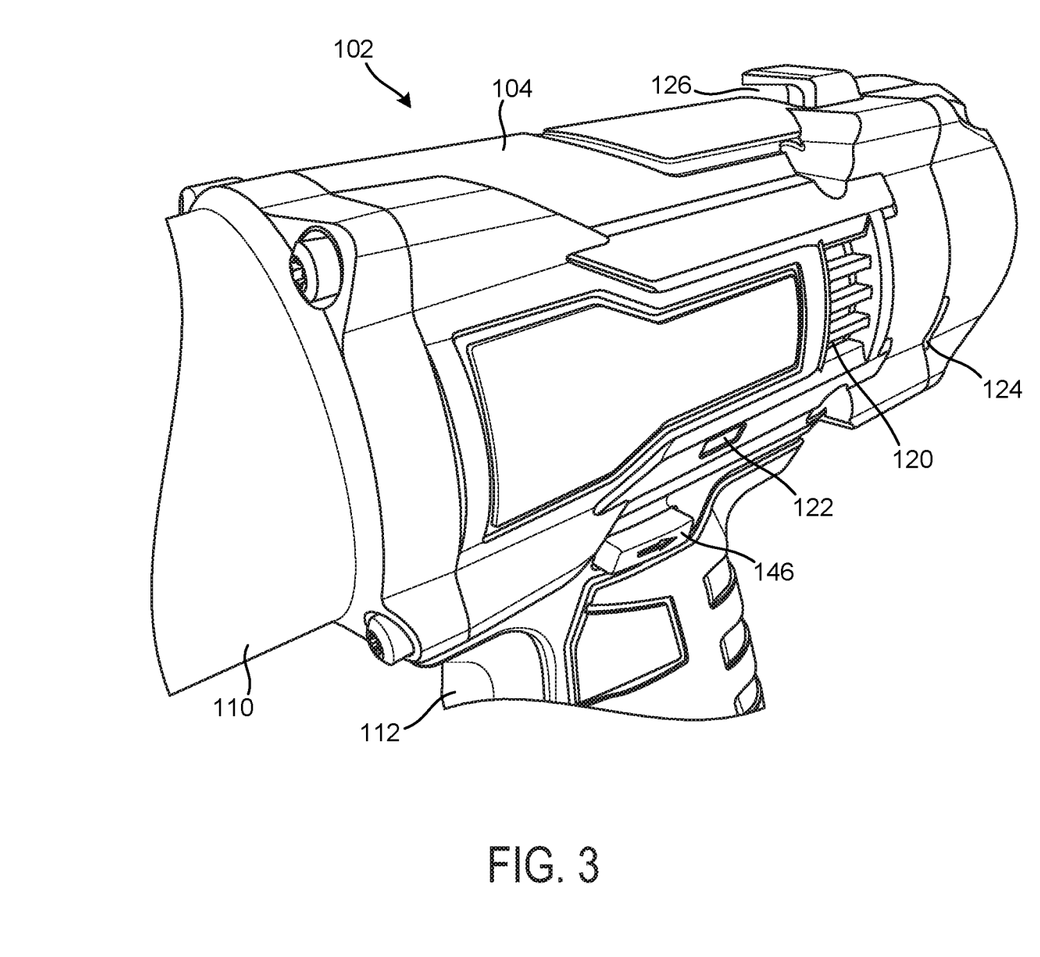
FIG. 3 is a first perspective view of a side of the exemplar tool, according to an embodiment of the present invention.
Figure 4:
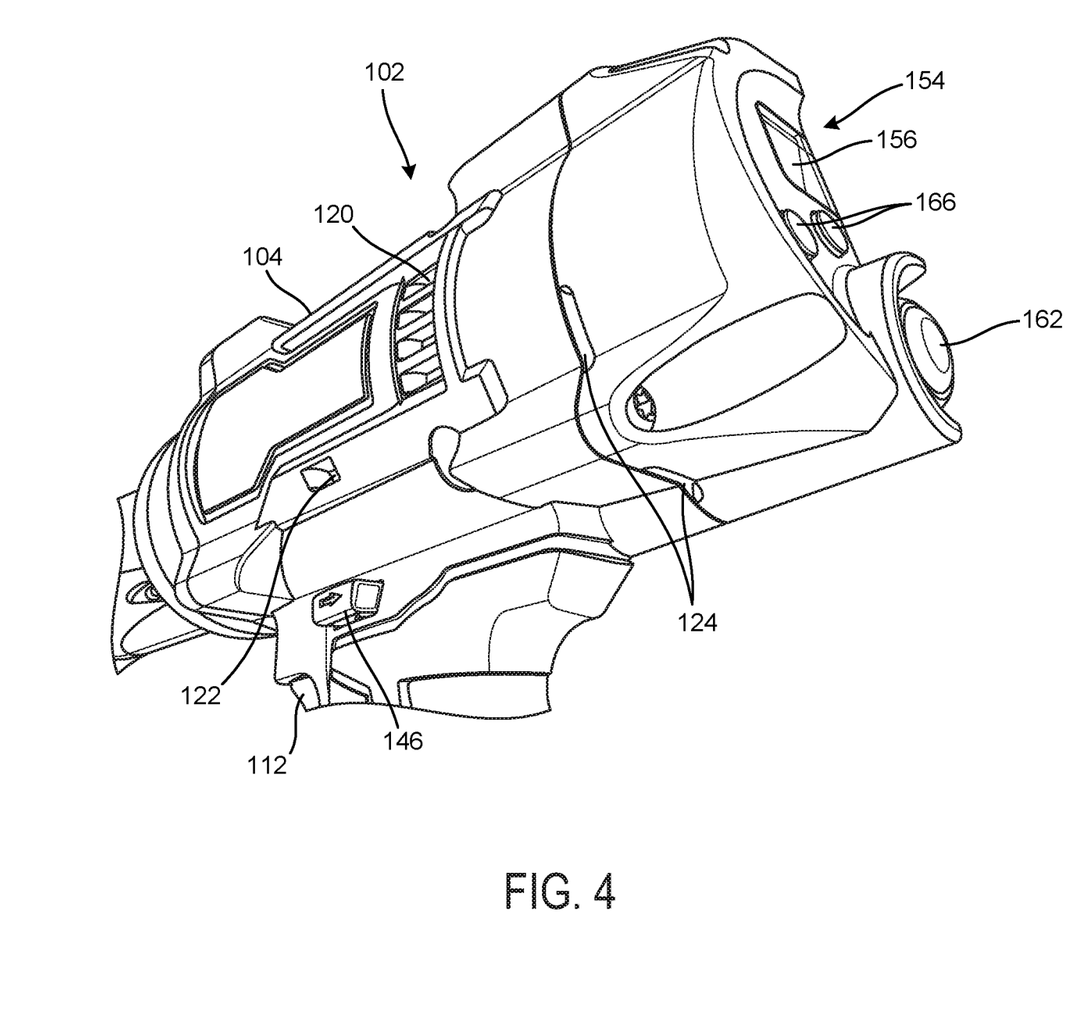
FIG. 4 is a second perspective view of the side of the exemplar tool, according to an embodiment of the present invention.

Referring to FIGS. 3 and 4, the housing 102 also includes one or more motor air inlet ports 120 and one or more motor air outlet ports 122 that provide cooling air flow into and out of the motor housing portion 116, and one or more electronic components air inlet ports 124 and one or more electronic components air outlet ports 126 that provide cooling air flow into and out of the electronic components housing portion 114. As illustrated, the motor air inlet port(s) 120 may be formed in the motor housing portion 116 proximal to a rear of the motor 106 and/or proximal to the electronic components housing portion 114. The motor air outlet port(s) 122 may be formed in the motor housing portion 116 proximal to the handle housing portion 118 (distal to the electronic components housing portion 114). Similarly, the electronic components air inlet port(s) 124 may be formed in the electronic components housing portion 114 proximal to a rear of the electronic components housing portion 114 (distal to the motor housing portion 116), and the electronic components air outlet port(s) 126 may be formed in the electronic components housing portion 118 proximal to motor housing portion 116. The electronic components air inlet port(s) 124 may also be formed in a bottom of the electronic components housing 116, and the electronic components air outlet port(s) 126 formed in a top of the electronic components housing 116. The electronic components air outlet port(s) 126 may also be shaped to direct cooling air flowing out of the electronic components housing 116 away from the user and away from the motor air inlet port(s) 120.

While the location of the various air inlet and outlet ports have been described, it will be appreciated that the locations may be changed based on the type of tool and desired direction of cooling air flow through the tool. For example, and without limitation, the motor air inlet port(s) 120 may be formed in the motor housing portion 116 proximal to a front of the motor 106 and/or distal to the electronic components housing portion 114, and the motor air outlet port(s) 122 may be formed in the motor housing portion 116 distal to the handle housing portion 118 (proximal to the electronic components housing portion 114). Similarly, the electronic components air inlet port(s) 124 may be formed in the electronic components housing portion 114 proximal to a front of the electronic components housing portion 114 (proximal to the motor housing portion 116), and the electronic components air outlet port(s) 126 may be formed in the electronic components housing portion 118 distal to the motor housing portion 116. The electronic components air inlet port(s) 124 may also be formed in a top of the electronic components housing 116, and the electronic components air outlet port(s) 126 formed in a bottom of the electronic components housing 116.

Referring to FIG. 1, the motor 106 is disposed in the motor housing portion 116 and operably coupled to the trigger 112. The motor 106 may be a brushless (BLDC) or brushed type motor, or any other suitable motor. The motor 106 may include a motor fan 128, and a motor shaft that extends from a working or front end of the motor 106 and that is operably coupled to the output nose mechanism 110. Thus, actuation of the trigger 108 (such as depression of the trigger 108) causes the motor 116 to operate and rotate the output nose mechanism 110. Referring to FIGS. 1, 3, and 4, in a first cooling system or motor cooling system, during operation of the motor 106, the motor fan 128 rotates and causes external cooling air (air external to the tool 100) to be pulled into the motor housing portion 116 through the motor air inlet port(s) 120. The cooling air flows around and/or through the motor 106 to collect heat from the motor 106, thus cooling the motor 106. The cooling air is heated by the motor 106 as the cooling air flows around and/or through the motor 106, and the cooling air, which has collected heat from the motor 106, is exhausted out of the tool housing 102 through the motor air outlet port(s) 122.

Figure 2:
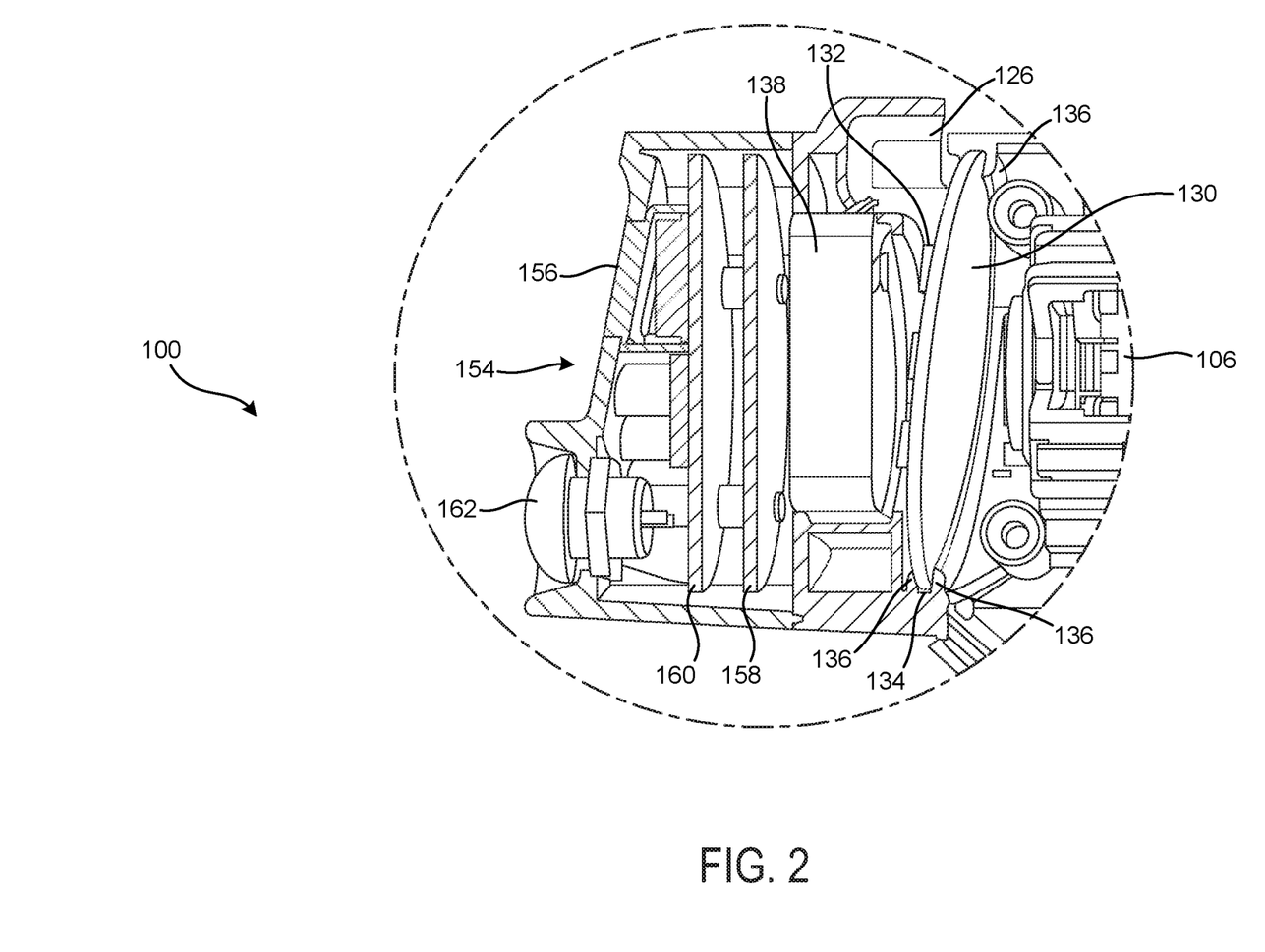
FIG. 2 is an enlarged view of the electronic components cooling system of FIG. 1.
Figure 6:
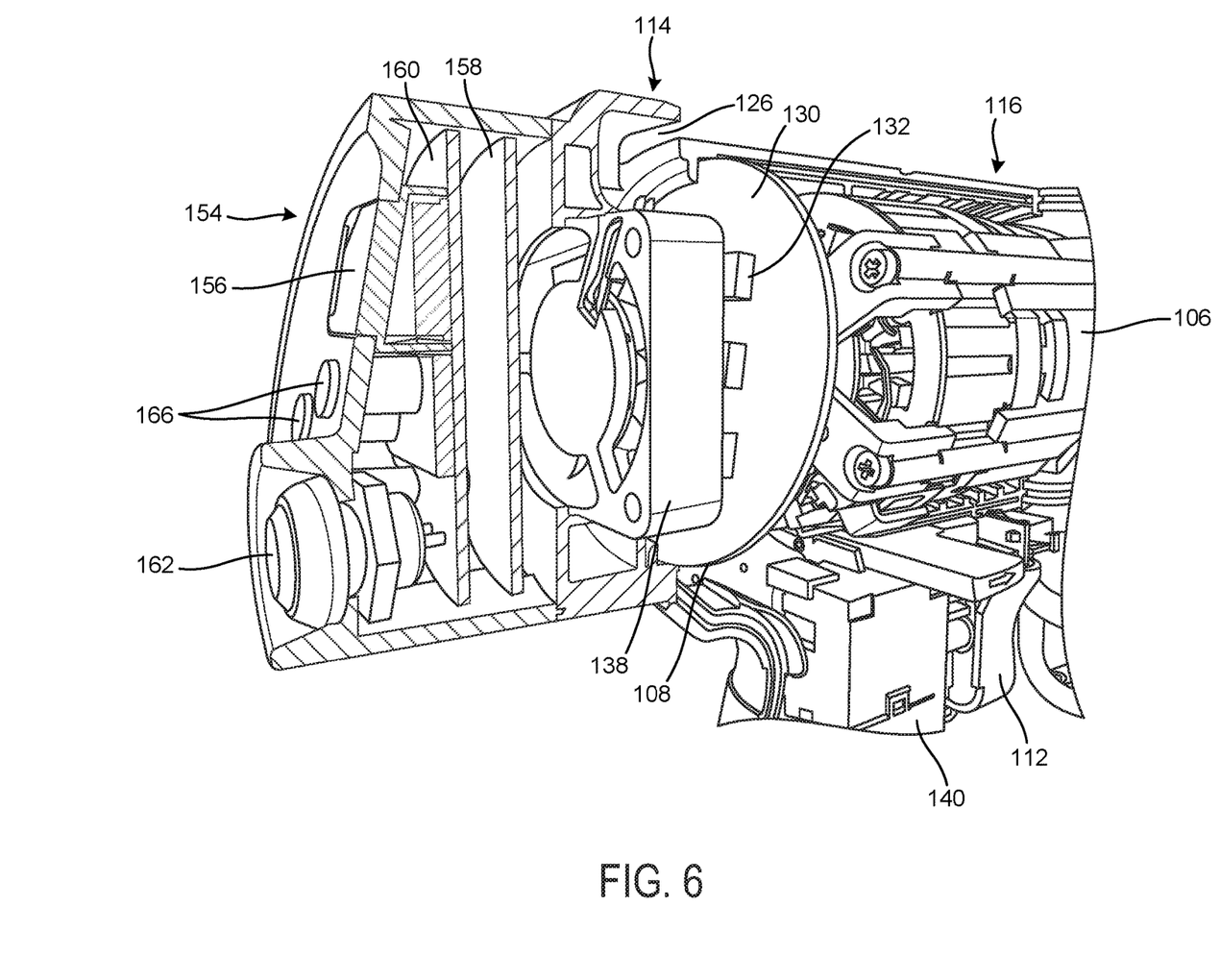
FIG. 6 is an enlarged perspective view of the electronic components cooling system of FIG. 1.

Referring to FIGS. 1, 2, and 6, electronic components 108 (such as PSE) is disposed in the electronic components housing portion 114. In an embodiment, the electronic components 108, such as PSE, are operably coupled to and adapted to control the motor 106. For example, the electronic components 108 may be a PSE and include a printed circuit board (PCB) 130 including one or more switching elements 132 disposed thereon. The switching elements 132 may be field effect transistors (FETs), such as, metal-oxide semiconductor field-effect transistors (MOSFETs). In an example, the switching elements 132 may include three high-side switching elements, H1, H2, and H3, and three low-side switching elements, L1, L2, and L3, each having a first or conducting state and a second or non-conducting state. The switching elements 132 are controlled by the PCB 130 to selectively apply power from a power source (e.g., a battery pack) to the motor 106 to achieve desired commutation. By activating particular high side and low side switching elements 132, the motor 106 is operated by having a controller or PCB 130 send a current signal through coils located on a stationary part of the motor 106 called a stator. The coils cause a magnetic force to be applied to a rotating part of the motor 106, called a rotor, when current runs through the coils. The rotor contains permanent magnets that interact with the magnetic forces caused by the windings of the stator. By activating successive combinations of high and low side switching elements in a particular order, thereby sending a particular order of current signals through the windings of the stator, the stator creates a rotating magnetic field which interacts with the rotor causing it to rotate, which rotates the motor shaft, in a well-known manner.

As shown in FIG. 2, the electronic components 108 may be held in place in the electronic components housing portion 114 and proximal to the rear end of the motor 106 by a groove 134 formed on an internal surface of the housing 102. The groove 134 may be formed between opposing flanges 136 that protrude inwardly from the housing 102. The groove 134 receives and the flanges 136 retain edges of the PCB 130 in the groove 134 to hold the PCB 130 in place. In an embodiment, the groove 134 may be a circumferential type groove that extend around the internal surface of the housing 102.

The PCB 130 may form a barrier between the electronic components housing portion 114 and the motor housing portion 116. For example, the PCB 130 may restrict or prevent the flow of cooling air between the electronic components housing portion 114 and the motor housing portion 116. The PCB 130 may also be oriented perpendicular or at an angle (such as between about 0 degrees to about 90 degrees, and more particularly about 45 degrees to about 90 degrees) with respect to a longitudinal axis of the electronic components housing portion 114 and the motor housing portion 116.

The tool 100 may also include a fan 138 disposed in the electronic components housing portion 114 and rearward of the electronic components 108. For example, the fan 138 may be positioned further away from the output nose mechanism 110 than the electronic components 108. The fan 138 is also disposed longitudinally between the electronic components air inlet port(s) 124 and the electronic components air outlet port(s) 126. The fan 138 may be adapted to be manually operated by a user (for example, via an ON and OFF type switch, such as via buttons 166 illustrated in FIGS. 4-6), automatically operated, or turned ON via actuation of the trigger 112 or activation of the tool 100 (for example, via switch mechanism 140 and/or the one or more of PCB 130, torque controller 158, and display PCB 160), and/or automatically turned ON and OFF based on output of a temperature type sensor disposed in the electronic components housing portion 114. The temperature sensor may be part of the PCB 130 or a separate component.

In an example, when the fan 138 is automatically operated or turned ON via actuation of the trigger 112 or activation of the tool 100, the tool 100 may wake up or enter an ON state when the trigger 112 is actuated. The tool 100 may then remain in the ON state for a predetermined amount of time after the trigger 112 is released or unactuated. The fan 138 may operate continuously when the tool is in the ON state. This allows the fan 138 to begin operating when the trigger 112 is depressed, and remain operating for the predetermined amount of time after the trigger 112 is released.

Figure 5:
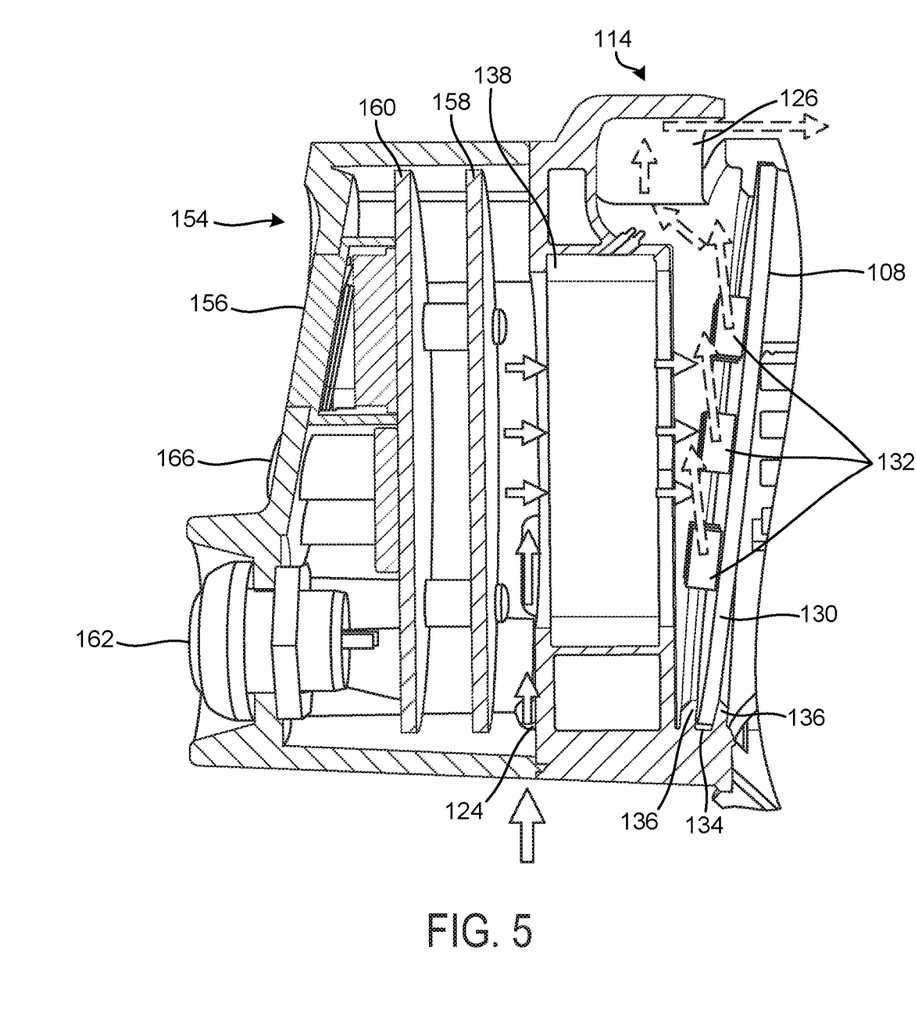
FIG. 5 is another enlarged view of the electronic components cooling system of FIG. 1 showing a flow of cooling air, according to an embodiment of the present invention.

Referring to FIG. 5, in a second cooling system or electronic components cooling system, during operation of the fan 138, the fan 138 causes external cooling air (air external to the tool 100) to be pulled into the electronic components housing portion 114 through the electronic components air inlet port(s) 124 (shown as solid arrows in FIG. 5). The cooling air flows over and/or around the electronic components 108 to collect heat from the electronic components 108, thus cooling the electronic components 108 (including, in an embodiment, the switching elements 132 and PCB 130). The cooling air is heated by the electronic components 108 as the cooling air flows over and/or around the electronic components 108, and the cooling air that has collected heat from the electronic components 108 (shown as dashed arrows in FIG. 5) is exhausted out of the tool housing 102 through the electronic components air outlet port(s) 126. The angled nature of the PCB 130 may also assist in directing the heated cooling air towards and out of the electronic components air outlet port(s) 126. In this regard, the PCB 130 may be oriented at any angle that directs the heated air towards and out of the electronic components air outlet port(s) 126.

Thus, the tool 100 includes two cooling systems; a first cooling system for cooling the motor 106, and a second cooling system for cooling the electronic components 108, such as, for example, PSE. As described above, the first cooling system includes a motor fan 128 that draws cooling air into the housing 102 through the motor air inlet port(s) 120 into the motor housing portion 116, and around and/or through the motor 106 to cool the motor 106. The second cooling system includes another fan 138, separate from motor fan 128, that may run continuously or be turned on at a predetermined temperature, and cools the electronic components 108 independently from the first cooling system. The second cooling system draws cooling air into the housing 102 through the electronic components air inlet port(s) 124 and into the electronic components housing portion 114, and around and/or over the electronic components 108 to cool the electronic components 108. Thus, the second cooling system minimizes tool shut down due to overheating since it is using cooling air that is not already heated via motor 106. The second cooling system also allows for the tool 100 to be run or operated continuously, minimizing premature shut down due to overheating of the electronic components 108. Further, because the second cooling system is independent from the first cooling system, the second cooling system can be operated when the motor 106 is not operated.

The tool 100 may also include additional components. For example, and without limitation, referring to FIG. 1, the tool 100 may include a switch mechanism 140 disposed in the motor housing portion 116 or handle housing portion 118, and is operably coupled to a power source (such as a battery) and the motor 116 via the electronic components 108. In an embodiment, the actuatable trigger 108 is disposed substantially at an intersection of the handle and motor housing portions 118 and 116, and is operably coupled to the switch mechanism 140. Actuation of the trigger 112 (such as depression of the trigger 112) causes the motor 106 to operate and rotate the motor shaft in either one of first and second rotational directions in a well-known manner. In an embodiment, the trigger 112 may also be biased such that the trigger 112 is depressible inwardly, relative to the tool 100, to cause the tool 100 to operate, and a release of the trigger 112 causes the trigger 112 to move outwardly, relative to the tool 100, to cease operation of the tool 100 via the biased nature of the trigger 112.

The trigger 112 and switch mechanism 140 may also be a variable speed type mechanism. In this regard, actuation or depression of the trigger 112 causes the motor 106 to rotate the motor shaft at a faster speed the further the trigger 112 is depressed. The switch mechanism 140 may also be coupled to a controller (which may include a printed circuit board) including battery contacts that couple to corresponding electrical contacts on a removable battery 142. In this regard, the handle housing portion 118 may include a battery coupling mechanism 144 adapted to receive and couple to the removable battery 142. While, the tool 100 is described as being powered by a battery, the tool 100 may be power by other electrical power sources, such as an external wall outlet, etc.

A direction selector 146 may be disposed near an intersection of the motor housing portion 116 and the handle housing portion 118. The direction selector 146 is adapted to be moved between first and second positions (for example, by a user) to allow the user to select the desired rotation direction of the motor 106. For example, movement of the direction selector 146 to the first position causes selection of the first rotational direction, and movement of the direction selector 146 to the second position causes selection of the second rotational direction.

The output nose mechanism 110 may include a drive lug 148 adapted to receive a variety of tool bits or sockets (including, driver bits, drill bits, cutting bits, socket bits, grinding bits, etc.). The output nose mechanism 110 may receive and engage the shaft of the motor 106. For example, the output nose mechanism 110 may include a gear or transmission mechanism 150 that couples to and/or engages the shaft of the motor 106, and transfers rotation of the shaft to the drive lug 148. Thus, rotation of the shaft of the motor 106 causes rotation of the drive lug 148. The gear or transmission mechanism 150 may provide low speed and high torque output at the drive lug 148, or high speed and low torque output at the drive lug 148.

The tool 100 may also optionally include a reaction assembly 152 coupled to the output nose assembly 110. The reaction assembly 152 may be used to absorb and transfer reaction forces that are produced during a torquing or fastening operation to a reaction point, instead of an operator.

While the tool 100 is described above as having an output nose mechanism 110 with a drive lug 148, the tool 100 may have different types of output nose mechanisms. For example, the tool 100 may include a output nose mechanism that includes a drill chuck, a hammer type output with a drill chuck or a drive lug, an impact type mechanism with a drill chuck or a drive lug, etc. The drive lug or drill chuck or can be coupled to other devices, such as a socket or other adapter, to apply torque to a work piece, such as, for example, a screw or bolt, in a well-known manner.

Referring to FIGS. 1 and 6, the tool 100 may also include a display housing portion 154 including a user visible display 156. The display housing portion 154 may be part of the housing 102 or a separate piece that is coupled to the housing 102. As illustrated, the display housing portion 154 is disposed at a rear of the tool 100, proximal to a rear end of the electronic components housing portion 114, with the electronic components housing portion 114 disposed between the display housing portion 154 and the motor housing portion 116. A torque controller 158 and a display PCB 160 may be housed in the display housing portion 154. The torque controller 158 and display PCB 160 may be separate, as illustrated, or combined into a single controller/PCB. Further, an optional secondary trigger 162 may be coupled to the display housing portion 154. When the secondary trigger 162 is incorporated into the tool 100, a user may start operation of the tool 100 by actuating both of the secondary trigger 162 and the trigger 112. For example, simultaneous actuation of the trigger 162 (such as depression of the trigger 162) and the trigger 112 causes the tool 100 to start. After the tool 100 has been started, actuation of the trigger 112 causes the motor 106 to operate and rotate the motor shaft in either one of first and second rotational directions in a well-known manner, as described above.

The display 156 may be operated by software/firmware executed by the display PCB 160 and/or torque controller 158 to display information for the user to view and interpret. Such information may be formatted as text, graphics, or a combination thereof. The display 156 may also be used to provide feedback when information is entered into the tool 100, such as via one or more buttons 166. The button(s) 166 may also be used to control the operation of the fan 138. The display 156 may be a liquid crystal display (LCD) display, an organic light emitting diode (OLED) display, an electronic paper display, or any kind of black-and-white or color display that has suitable power-consumption requirements and volume to facilitate integration into the tool 100. The display 156 may optionally be touch-sensitive, with software or firmware executed by the display PCB 160 and/or torque controller 158 providing virtual on-screen controls.

The torque controller 158 may be used to configure torque settings of the tool 100, for example, target torque value, minimum and maximum torque values, etc. The torque controller 158 may also be used to configure a mode of the tool 100, such as, for example, torque, angle, torque then angle or torque and angle measurement modes. The torque controller 158 may also be used to interpret output of other components of the tool 100 to determine and/or cause the display or torque and/or angular rotation values applied by the tool to a work piece.

The tool 100 may also include a wireless transceiver 164. As illustrated, the wireless transceiver 164 is disposed in the handle housing portion 118. However, it will be appreciated that the wireless transceiver 164 may be located in other locations within the housing 102. The wireless transceiver 164 may enable the tool 100 to communicate with, and send and receive data from an external device. For example, the tool 100 may communicate with the external device via a wireless communications link using a protocol such as Bluetooth, Bluetooth Smart (also known as Bluetooth low energy), Wi-Fi Direct, or any other wireless protocol.

As discussed herein, the tool 100 is a power tool, such as a torque application type tool. However, the tool 100 can be any electrically powered or hand-held tool, including, without limitation, a drill, hammer drill, impact wrench, ratchet wrench, router, polisher, screwdriver, or other powered tool, that is powered by electricity via a power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A power tool having a housing, the power tool comprising:
    a motor housing portion and an electronic components housing portion cooperatively forming the housing;
    a motor having front and rear ends and disposed in the motor housing portion;
    electronic components disposed in the electronic components housing portion proximal to the rear end of the motor; and
    a fan disposed in the electronic components housing portion and adapted to cause cooling air to flow into the electronic components housing portion to cool the electronic components.

2. The power tool of claim 1, wherein the electronic components includes a printed circuit board (PCB) and switching elements disposed on the PCB, wherein the PCB is disposed proximal to the rear end of the motor and forms a barrier between the motor housing portion and the electronic components housing portion.

3. The power tool of claim 2, wherein the PCB is oriented at an angle with respect to a longitudinal axis of the motor and electronic components housing portions.

4. The power tool of claim 3, wherein the angle is about 45 degrees to about 90 degrees.

5. The power tool of claim 1, further comprising an air inlet port in the electronic components housing portion distal to motor housing portion, and an air outlet port in the electronic components housing portion proximal to motor housing portion.

6. The power tool of claim 5, wherein the fan is disposed between the air inlet and air outlet ports.

7. The power tool of claim 6, wherein the fan is adapted to cause the cooling air to flow through the air inlet port and into the electronic components housing portion and out of the air outlet port.

8. The power tool of claim 7, wherein the electronic components includes a printed circuit board (PCB), and wherein the PCB is oriented at an angle with respect to a longitudinal axis of the motor and electronic components housing portions, and is adapted to direct the cooling air to flow out of the air outlet port.

9. The power tool of claim 1, wherein the fan is adapted to operate based on a predetermined temperature within the electronic components housing portion.

10. The power tool of claim 1, wherein the fan is adapted to operate based on activation of the power tool.

11. The power tool of claim 1, wherein the fan is adapted to operate via an ON and OFF type switch.

12. A power tool having a housing, the power tool comprising:
    a motor housing portion and an electronic components housing portion cooperatively forming the housing;
    a motor having front and rear ends and disposed in the motor housing portion;
    a first fan coupled to the motor and adapted to cause cooling air to flow into the motor housing portion to cool the motor;
    electronic components disposed in the electronic components housing portion, wherein the electronic components includes a printed circuit board (PCB) and switching elements disposed on the PCB, the PCB is disposed proximal to the rear end of the motor and forms a barrier between the motor housing portion and the electronic components housing portion; and
    a second fan disposed in the electronic components housing portion and adapted to cause cooling air to flow into the electronic components housing portion to cool the electronic components.

13. The power tool of claim 12, wherein the PCB is oriented at an angle with respect to a longitudinal axis of the motor and electronic components housing portions.

14. The power tool of claim 13, wherein the angle is about 45 degrees to about 90 degrees.

15. The power tool of claim 12, further comprising an air inlet port in the electronic components housing portion distal to motor housing portion, and an air outlet port in the electronic components housing portion proximal to motor housing portion.

16. The power tool of claim 15, wherein the second fan is disposed between the air inlet and air outlet ports.

17. The power tool of claim 16, wherein the second fan is adapted to cause the cooling air to flow through the air inlet port and into the electronic components housing portion, over the electronic components and out of the air outlet port.

18. The power tool of claim 17, wherein the PCB is oriented at an angle with respect to a longitudinal axis of the motor and electronic components housing portions and is adapted to direct the cooling air to flow out of the air outlet port.

19. The power tool of claim 12, wherein the second fan is adapted to operate based on a predetermined temperature within the electronic components housing portion.

20. The power tool of claim 12, wherein the second fan is adapted to operate based on activation of the power tool.

21. The power tool of claim 12, wherein the second fan is adapted to operate via an ON and OFF type switch.

* * * * *